United States Patent
Ito

(10) Patent No.: US 9,030,678 B2
(45) Date of Patent: May 12, 2015

(54) RECORDING SYSTEM, RECORDING APPARATUS, AND OPTION DEVICE

(71) Applicant: Ryo Ito, Nagoya (JP)

(72) Inventor: Ryo Ito, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/954,086

(22) Filed: Jul. 30, 2013

(65) Prior Publication Data

US 2014/0036286 A1 Feb. 6, 2014

(30) Foreign Application Priority Data

Jul. 31, 2012 (JP) .................................. 2012-169708

(51) Int. Cl.
*G06F 3/12* (2006.01)
*G06K 15/00* (2006.01)
*G06K 15/16* (2006.01)

(52) U.S. Cl.
CPC ............ *G06K 15/4025* (2013.01); *G06K 15/16* (2013.01)

(58) Field of Classification Search
None
See application file for complete search history.

(56) References Cited

U.S. PATENT DOCUMENTS

| 5,892,915 | A | * | 4/1999 | Duso et al. ..................... 709/219 |
| 2005/0286923 | A1 | * | 12/2005 | Kim ................................ 399/75 |
| 2009/0225361 | A1 | * | 9/2009 | Kobayashi ................... 358/1.15 |
| 2010/0020354 | A1 | * | 1/2010 | Ito ................................ 358/1.15 |
| 2010/0316407 | A1 | * | 12/2010 | Ito ................................... 399/90 |
| 2011/0176846 | A1 | * | 7/2011 | Ishizaki et al. ................ 399/367 |

FOREIGN PATENT DOCUMENTS

| JP | 6-064278 A | 3/1994 |
| JP | 2000-105521 A | 4/2000 |
| JP | 2001-096841 A | 4/2001 |
| JP | 2002-287578 A | 10/2002 |
| JP | 2006-315780 A | 11/2006 |
| JP | 2007-253486 A | 10/2007 |

* cited by examiner

*Primary Examiner* — Marivelisse Santiago Cordero
*Assistant Examiner* — Moustapha Diaby
(74) *Attorney, Agent, or Firm* — Scully, Scott, Murphy & Presser, P.C.

(57) ABSTRACT

Each of a plurality of option devices includes a signal changing unit connected to a first control unit of a recording apparatus without a second control unit of another option device and configured to change a signal supplied from the first control unit, and a communication line configured to connect the first control unit and the second control unit without the second control unit of another option device. The first control unit determines the number of the option devices by inputting a signal to the signal changing unit in each of the plurality of option devices. After that, in the case where communication can be performed between the first and second control units, it is determined that the second control unit of the option device is normal. In the case where the communication cannot be performed, it is determined that the second control unit is faulty.

13 Claims, 9 Drawing Sheets

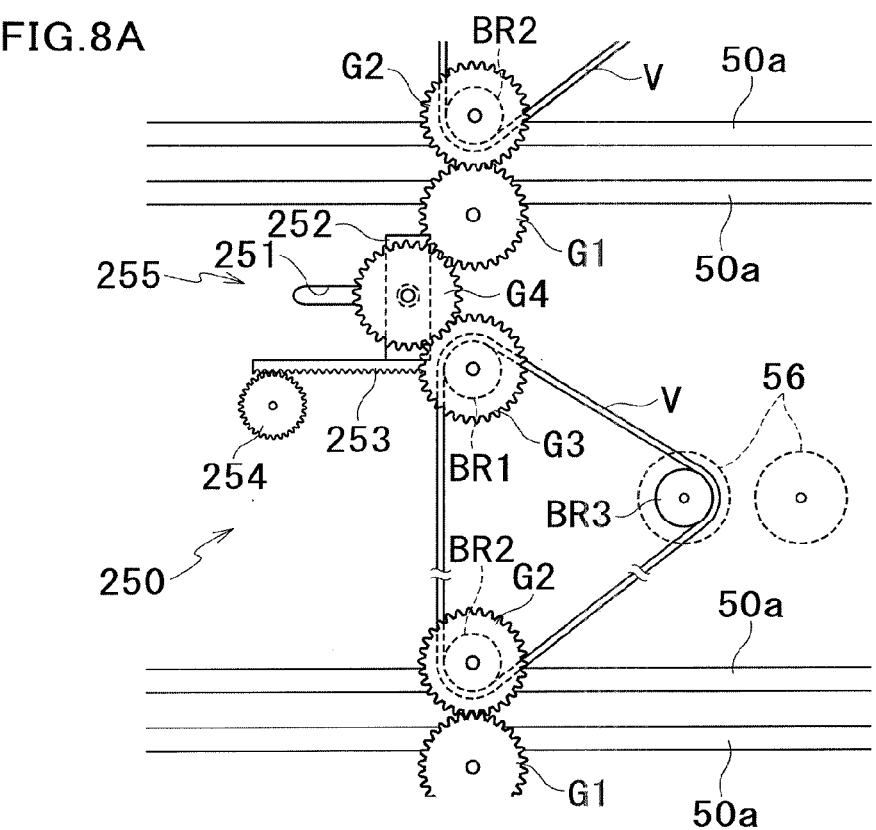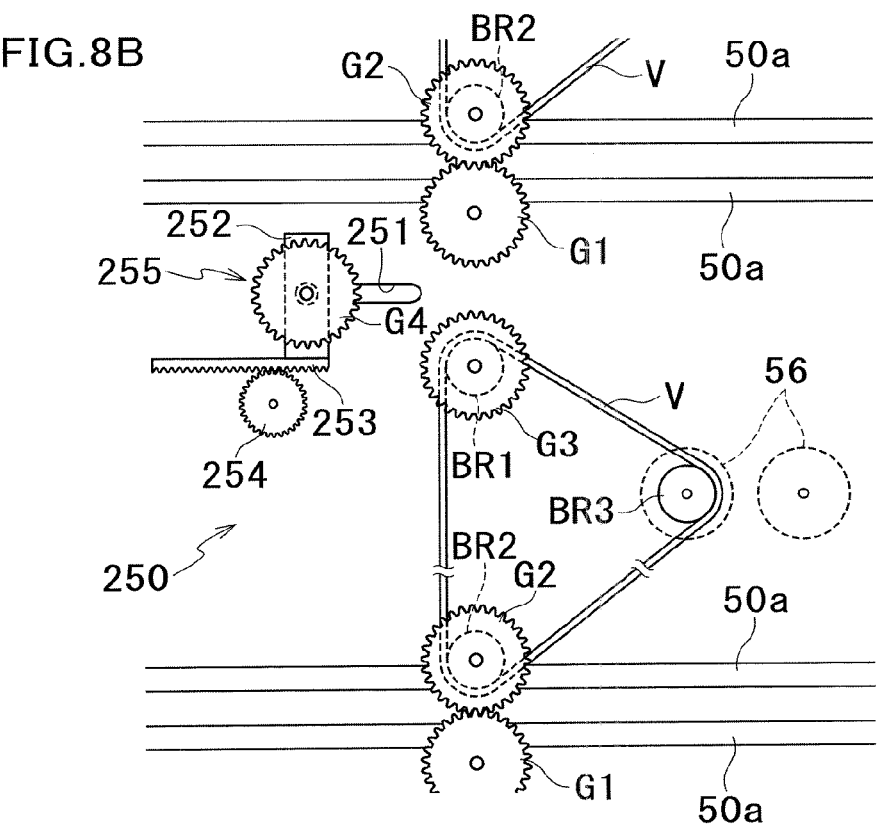

RECORDING SYSTEM, RECORDING APPARATUS, AND OPTION DEVICE

CROSS REFERENCE TO RELATED APPLICATION

The present application claims priority from Japanese Patent Application No. 2012-169708, which was filled on Jul. 31, 2012, the disclosure of which is incorporated herein by reference in its entirety.

BACKGROUND OF THE INVENTION

1. Field of the Invention

The present invention relates to a recording system to which a plurality of option devices can be connected to a recording apparatus, a recording apparatus, and an option device.

2. Description of Related Art

A recording system having a recording apparatus and a plurality of option devices connected in series to the recording apparatus is known. In the recording system, a control unit (for example, a CPU) is provided to the recording apparatus and each of the plurality of option devices. The control unit of each of the plurality of option devices is connected only to a control unit of another option device which is adjacent in series connection or a control unit of an adjacent recording apparatus so that communication can be performed. Therefore, communication between the control unit of the recording apparatus and the control unit of the option device in any of the second or subsequent stages in the series connection is performed via the control unit of another option device disposed therebetween.

In such a recording system, there is a known technique that a control unit of a recording apparatus transmits data synchronously with the rising edge of a clock to a control unit of an option device in the first stage and grasps the number of option devices connected to the recording apparatus on the basis of the number of clocks until the data returns to the control unit of the recording apparatus via the control units in the option devices in the second and subsequent stages.

SUMMARY OF THE INVENTION

In the recording system, however, in the case where a control unit in a certain option device fails and communication with the control unit cannot be performed, the control unit in the recording apparatus cannot perform communication with the control units in the option devices in stages posterior to the option device. As a result, the number of option devices connected in series to the recording apparatus cannot be grasped, and whether the control unit of an option device posterior to the failed option device is normal or not cannot be also determined.

An aspect of the present invention is to provide a recording system, a recording apparatus, and option devices capable of determining the number of option devices connected to the recording apparatus and determining whether the control unit of each of the option devices is normal or not.

A recording system as an embodiment includes a recording apparatus and a plurality of option devices. The recording apparatus is configured to record an image on a recording medium. The recording apparatus includes a first control unit configured to control an operation of the recording apparatus. The option devices are connected in series to the recording apparatus. Each of the option devices includes: a second control unit, a signal changing unit, and a communication line. The second control unit is configured to control an operation of the option device. The signal changing unit is connected to the first control unit without the second control unit of another option device and is configured to change a signal supplied from the first control unit. The communication line is configured to connect the first control unit and the second control unit without the second control unit of another option device. The first control unit is configured to supply the signal to the signal changing unit in each of the option devices, and determine the number of the option devices connected in series to the recording apparatus based on a change in the supplied signal, try communication with the second control unit in each of the option devices via the communication line, the option devices being connected in series to the recording apparatus, corresponding to the determined number of option devices, determine that the second control unit of the option device is normal when the communication is performed and, determine that the second control unit of the option device is faulty when the communication is not performed.

A recording apparatus as an embodiment is for use in a recording system including a recording apparatus having a first control unit and recording an image on a recording medium, and a plurality of option devices connected in series to the recording apparatus, each of the option devices having a second control unit, a signal changing unit connected to the first control unit without the second control unit of another option device and is configured to change a signal supplied from the first control unit, and a communication line configured to connect the first control unit and the second control unit without the second control unit of another option device. The first control unit is configured to: supply the signal to the signal changing unit in each of the option devices, and determine the number of the option devices connected in series to the recording apparatus based on a change in a signal responding to the input signal; try communication with the second control unit in each of the option devices via the communication line, the option devices being connected in series to the recording apparatus, corresponding to the determined number of option devices; determine that the second control unit of the option device is normal when the communication is performed; and determine that the second control unit of the option device is faulty when the communication is not performed.

An option device as an embodiment is for use in a recording system including a recording apparatus having a first control unit and recording an image on a recording medium, and a plurality of option devices connected in series to the recording apparatus, each of the option devices having a second control unit, in which the first control unit is configured to determine the number of the option devices connected in series to the recording apparatus based on a change in the signal responding to a signal supplied to each of the option devices, try communication with the second control unit in each of the option devices via the communication line, the option devices being connected in series to the recording apparatus, corresponding to the determined number of option devices, determine that the second control unit of the option device is normal when the communication is performed and, determine that the second control unit of the option device is faulty when the communication is not performed. The option device includes a signal changing unit and a communication line. The signal changing unit is connected to the first control unit without the second control unit of another option device and is configured to change the signal supplied from the first control unit. The communication line configured to connect the first control unit and the second control unit without the second control unit of another option device so that the first and second control units perform communication.

The "signal changing unit for changing a signal which is supplied from the first control unit" includes a mode in which when a signal output from the first control unit is supplied to the signal changing unit, the signal changing unit changes the signal, and a mode of changing a signal itself when a signal is output from the first control unit since the signal changing unit is connected to the first control unit.

BRIEF DESCRIPTION OF THE DRAWINGS

Other and further objects, features and advantages of the invention will appear more fully from the following description taken in connection with the accompanying drawings in which:

FIG. 8A is a diagram for explaining a transmitting mechanism illustrated in FIG. 7;

FIG. 8B is a diagram for explaining the transmitting mechanism illustrated in FIG. 7.

DESCRIPTION OF THE PREFERRED EMBODIMENTS

Hereinafter, as a preferred embodiment of the present invention, a recording system is applied to an ink jet printer system and the embodiment will be described with reference to the drawings.

<First Embodiment>

Figure 1:
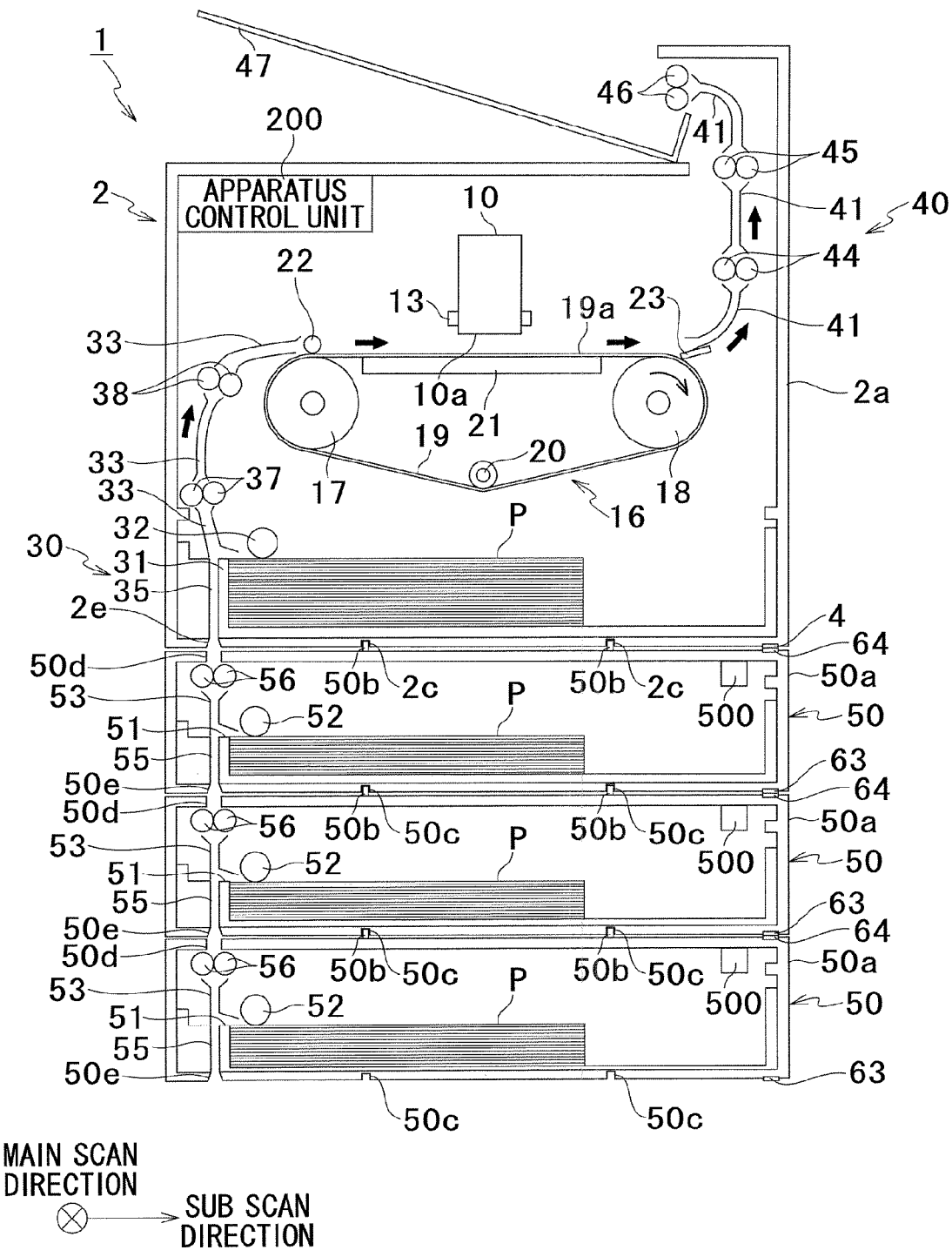
FIG. 1 is a schematic side view illustrating a mechanical configuration of a recording system according to a first embodiment.

First, with reference to FIG. 1, a general configuration of a recording system 1 according to a first embodiment will be described. As illustrated in FIG. 1, the recording system 1 includes a recording apparatus 2 for recording (forming) an image on a sheet of paper P and a plurality of additional paper-feed devices 50 as option devices detachably attached to the recording apparatus 2. The plurality of additional paper-feed devices 50 are connected in multiple stages (in the embodiment, connected in three stages and in series) to the recording apparatus 2, and the sheets of paper P can be fed from each of the additional paper-feed devices 50 to the recording apparatus 2.

Next, a mechanical configuration of the recording apparatus 2 will be described with reference to FIGS. 1 and 2. As illustrated in FIG. 1, the recording apparatus 2 includes an apparatus casing 2a having a rectangular parallelepiped shape. The apparatus casing 2a has a conveying unit 16 for conveying the paper P in a conveying direction (the direction from left to right in FIG. 1), an ink jet head 10 (hereinbelow, referred to as a head 10) for recording an image on the paper P conveyed by the conveying unit 16, a paper-feed unit 30 for feeding the paper P to the conveying unit 16, a paper ejecting unit 40 for ejecting the paper P on which an image is recorded to a paper ejection tray 47, a touch panel 85 (refer to FIG. 2), a power supply 90, an apparatus control unit 200 (first control unit) for controlling the general operation of the recording apparatus 2, and the like inside thereof.

In a lower part of a bottom plate of the apparatus casing 2a, positioning holes 2c used for positioning the additional paper-feed device 50 connected to the first stage in the recording apparatus 2 are formed, and a connector 4 are provided. As illustrated in FIG. 2, the connector 4 is provided with a communication connector 4a and a power connector 4b. In the bottom plate of the apparatus casing 2a, as illustrated in FIG. 1, a paper feed port 2e is provided for passing the paper P fed from the additional paper-feed device 50 positioned in a lower part.

Figure 2:
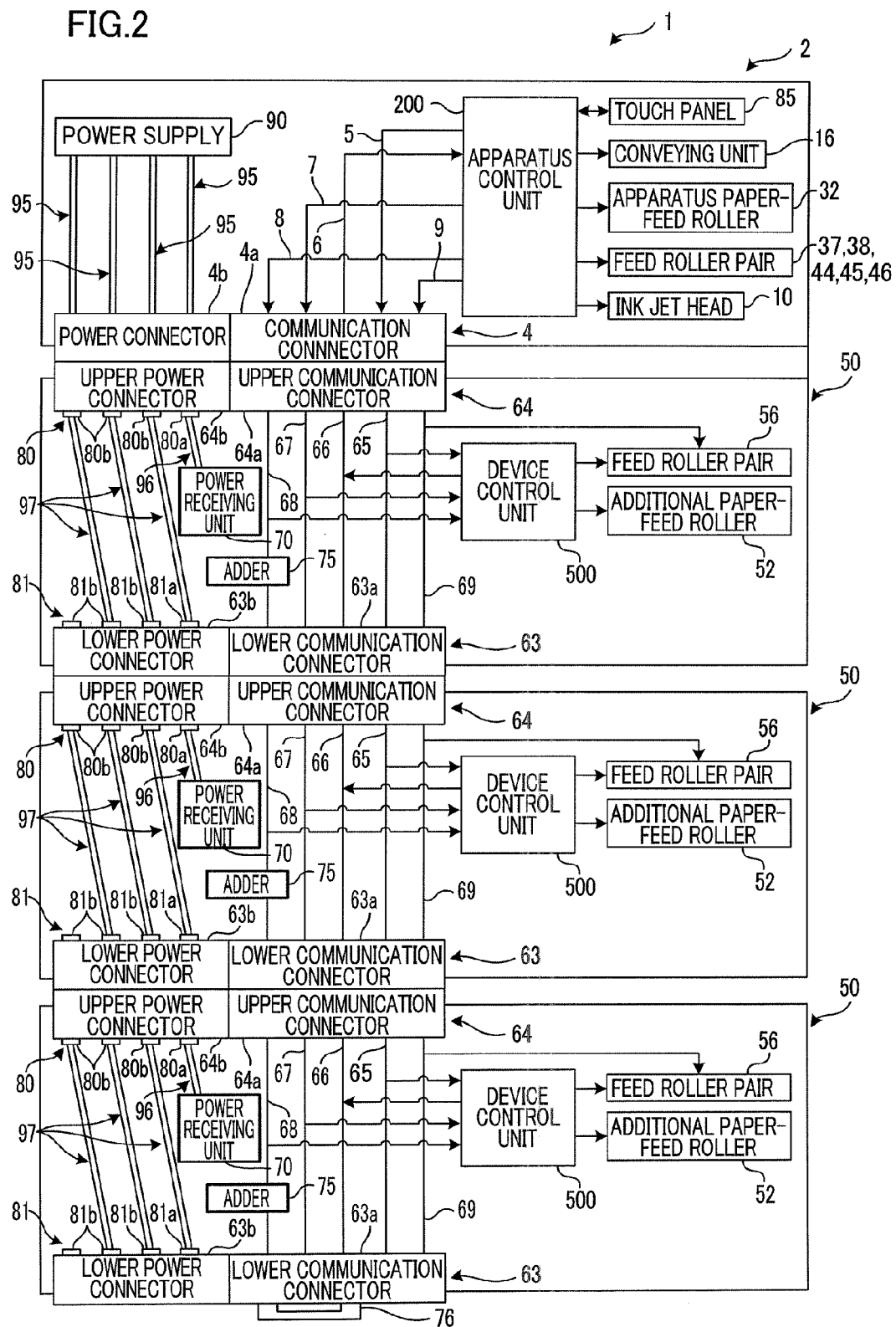
FIG. 2 is a diagram illustrating an electric configuration of the recording system shown in FIG. 1.

As illustrated in FIG. 2, the communication connector 4a is connected to the apparatus control unit 200 via communication lines 5 to 8 and a control line 9. The communication line 5 is a communication line for the recording apparatus 2 to transmit various signals other than a reset signal and a connection signal to the additional paper-feed device 50. For example, to the communication line 5, a command signal controlling the conveying operation of each of the additional paper-feed devices 50 is supplied from the apparatus control unit 200. The communication line 6 is a communication line for the recording apparatus 2 to receive various signals from the additional paper-feed device 50. The communication line 7 is a signal line for the recording apparatus 2 to transmit a reset signal to the additional paper-feed device 50. The reset signal is a signal for initializing an identifier stored in an identifier storing unit 602 which will be described later in the additional paper-feed device 50. The communication line 8 is a communication line for the recording apparatus 2 to transmit a connection signal to the additional paper-feed device 50. The connection signal is a signal for the recording apparatus 2 to determine the number of the additional paper-feed devices 50 connected in series to the recording apparatus 2 and for giving an identifier peculiar to each of the additional paper-feed devices 50. In the embodiment, the connection signal is three bits signal which are set to "000" when it is sent from the recording apparatus 2. The control line 9 is a control line for the recording apparatus 2 to transmit a control signal for controlling a feed roller pairs 56 to be described later in the additional paper-feed device 50.

The power connector 4b is connected to the power supply 90 via a plurality of power lines 95. The power lines 95 are connected in parallel to the power supply 90 and include positive power supply lines and negative power supply lines. The number of the power lines 95 is equal to that of the additional paper-feed devices 50 which can be connected in series to the recording apparatus 2.

As illustrated in FIG. 1, the paper-feed unit 30 includes an apparatus paper-feed tray 31 detachably attached to the apparatus casing 2a in a sub scan direction, an apparatus paper-feed roller 32, paper conveyance paths 33 and 35, and feed roller pairs 37 and 38. The apparatus paper-feed tray 31 is a box which opens upward and houses a plurality of sheets of paper P. The apparatus paper-feed roller 32 feeds the uppermost sheet of paper P in the apparatus paper-feed tray 31 to the paper conveyance path 33. The sub scan direction is parallel to the conveyance direction when the paper P is conveyed by the conveying unit 16. The main scan direction is orthogonal to the sub scan direction and is along the horizontal face.

The paper conveyance path 33 extends from the apparatus paper-feed roller 32 toward the conveying unit 16. In the paper conveyance path 33, the feed roller pairs 37 and 38 are disposed at a proper interval from the upstream of the conveyance direction of the paper P in order. The paper conveyance path 35 guides the paper P fed from the additional paper-feed device 50 positioned below to the paper conveyance path 33, and extends from the paper feed port 2e toward the paper conveyance path 33. The paper P fed to the paper conveyance path 33 is sequentially conveyed while being sandwiched by the feed roller pairs 37 and 38 to the conveying unit 16.

The conveying unit 16 includes two belt rollers 17 and 18, a conveyance belt 19, a tension roller 20, a platen 21, a nip roller 22, and a peeling plate 23. The conveyance belt 19 is an endless belt wound around the rollers 17 and 18, and tension is applied to the conveyance belt 19 by the tension roller 20. The platen 21 is disposed so as to be opposed to the head 10 and supports the upper-side loop of the conveyance belt 19 from the inner side. The belt roller 18 is a driving roller rotating in the clockwise direction in FIG. 1 to make the conveyance belt 19 move. The belt roller 17 is a driven roller which rotates when the conveyance belt 19 moves. On a conveyance face 19a of the conveyance belt 19, a weak-adhesion silicon layer is formed. The nip roller 22 presses the paper P conveyed from the apparatus paper-feed tray 31 or the additional paper-feed device 50 via the paper conveyance path 33 against the conveyance face 19a. The pressed paper P is held by the silicon layer of the conveyance belt 19. The peeling plate 23 peels the paper P on the conveyance belt 19 from the conveyance belt 19.

The head 10 is a line head having a substantially rectangular parallelepiped shape which is long in the main scan direction, and its under face is an ejection face 10a in which a number of ejection ports are open. The head 10 is supported by the apparatus casing 2a via a head holder 13. The head holder 13 holds the head 10 so that a predetermined gap adapted to an image recording is formed between the ejection face 10a and the conveyance face 19a of the conveyance belt 19. When the paper P conveyed by the conveyance belt 19 passes just below the head 10, ink drops of black are sequentially discharged from the head 10 toward the top face of the paper P to form a desired black-and-white image on the paper P. The paper P on which the image is formed is conveyed from the conveying unit 16 to the right side in FIG. 1, peeled from the conveyance belt 19 by the peeling plate 23, and transmitted to the ejecting unit 40.

The ejecting unit 40 includes a paper conveyance path 41 and feed roller pairs 44 to 46. The paper conveyance path 41 extends from the conveying unit 16 toward the paper ejection tray 47. The feed roller pairs 44 to 46 are disposed at a proper interval from the upstream in the conveyance direction of the paper P in order. The paper P transmitted to the paper conveyance path 41 is sequentially conveyed while being sandwiched by the feed roller pairs 44 to 46 and ejected to the paper ejection tray 47.

Next, the mechanical configuration of the additional paper-feed device 50 will be described. As illustrated in FIG. 1, the additional paper-feed device 50 has a device casing 50a. The device casing 50a has an additional paper-feed tray 51 detachably attached to the device casing 50a, an additional paper-feed roller 52, a power receiving unit 70 for receiving power supplied from the recording apparatus 2 and distributing the power to various devices in the additional paper-feed device 50 (see FIG. 2), a device control unit 500 for controlling the operation of the entire additional paper-feed device 50, and the like therein. Like the apparatus paper-feed tray 31, the additional paper-feed tray 51 is a box which opens upward and houses a plurality of sheets of paper P. The additional paper-feed roller 52 feeds the uppermost paper P in the additional paper-feed tray 51 to a paper conveyance path 53 to be described later.

In a lower part of the bottom plate of the device casing 50a, a lower connector 63 is provided in a position matching the connector 4 in the recording apparatus 2 in the horizontal direction in FIG. 1. In an upper part of the top plate of the device casing 50a, an upper connector 64 which can be connected to any of the connector 4 of the recording apparatus 2 and the lower connector 63 of another additional paper-feed device 50 is provided. The upper connector 64 is provided with an upper communication connector 64a and an upper power connector 64b, and the lower connector 63 is provided with a lower communication connector 63a and a lower power connector 63b.

The upper communication connector 64a and the lower communication connector 63a are connected to each other via communication lines 65 to 68 and a control line 69. Each of the communication lines 65 to 68 and the control line 69 includes a main line connecting the upper communication connector 64a and the lower communication connector 63a, and a branch line. The branch lines of the communication lines 65 to 68 are branched from the main lines and reach the device control unit 500. The branch line of the control line 69 is branched from the main line and reaches the feed roller pair 56 which will be described later.

When the upper connector 64 is connected to the connector 4 of the recording apparatus 2, the communication lines 65 to 68 and the control line 69 are connected to the communication lines 5 to 8 and the control line 9 in the recording apparatus 2, respectively. When the upper connector 64 is connected to the lower connector 63 of another additional paper-feed device 50, the communication lines 65 to 68 and the control line 69 are connected to the communication lines 65 to 68 and the control line 69 of the another additional paper-feed device 50, respectively.

With the configuration, in an additional paper-feed device 50 connected in the second or any subsequent stage to the recording apparatus 2, various signals can be transmitted/received to/from the recording apparatus 2 via the main lines of the communication lines 65 to 68 of the additional paper-feed device 50 in an anterior stage of the additional paper-feed device 50. Further, the apparatus control unit 200 of the recording apparatus 2 and the device control unit 500 of each of the additional paper-feed devices 50 can be connected without the device control unit 500 of another additional paper-feed device 50. Consequently, even in the case where the device control unit 500 of another additional paper-feed device 50 is faulty, various signals can be transmitted/received. Further, the apparatus control unit 200 of the recording apparatus 2 and the feed roller pair 56 of each additional paper-feed device 50 are connected via the common control lines 9 and 69 without the device control unit 500 of the additional paper-feed device 50. Consequently, even in the case where there is an additional paper-feed device 50 in which the device control unit 500 is faulty, by controlling the feed roller pair 56 of the additional paper-feed device 50, the recording apparatus 2 can convey the paper P also to the additional paper-feed device 50 in which the device control unit 500 is faulty.

An adder 75 is provided on the lower communication connector 63a side in the main line of the communication line 68 with respect to the branch point of the branch line. The adder 75 adds one to the value of an input signal and outputs the resultant signal. For example, in the case where an input signal of three bits is "000", the adder 75 outputs "001". In the case where the input signal is "001", the adder 75 outputs "010". The lower communication connector 63a of an additional paper-feed device 50 at the furthest stage from the recording apparatus 2 is provided with a terminator 76. The terminator 76 connects the communication lines 66 and 68. In the configuration, when a connection signal (hereinbelow, also referred to as "input connection signal") is supplied from the recording apparatus 2 to the communication line 8, the connection signal is supplied to both of the device control unit 500 and the adder 75 via the communication line 68 of the additional paper-feed device 50 in the first stage. As will be described later, the input connection signal supplied to the device control unit 500 is stored as the identifier of the additional paper-feed device 50 into the identifier storing unit 602. On the other hand, one is added by the adder 75 to the input connection signal supplied to the adder 75, and the resultant signal is output to the communication line 68 of the additional paper-feed device 50 in the second stage. Also in the additional paper-feed devices 50 in the second and subsequent stages, the above-described processes are similarly performed. In the terminator 76 of the additional paper-feed device 50 in the furthest stage from the recording apparatus 2, a connection signal (hereinbelow, also referred to as "output connection signal") obtained by adding one by each of the adders 75 in the additional paper-feed devices 50 is output to the communication line 66 and is output to the recording apparatus 2. With the configuration, by comparing the value of the input connection signal supplied to the communication line 8 and the value of the output connection signal output from the communication line 6, the recording apparatus 2 can determine the number of the additional paper-feed devices 50 connected in series to the recording apparatus 2 without the device control units 500 in the additional paper-feed devices 50. For example, in the case where the value of the input connection signal is "000" and the value of the output connection signal is "011", the recording apparatus 2 can determine that the number of the additional paper-feed devices 50 connected in series to the recording apparatus 2 is three. In the embodiment, the adder 75 corresponds to a signal changing unit, and a signal supplied to the signal changing unit corresponds to a connection signal.

In the upper power connector 64b, a plurality of pins 80 which can be connected to the power lines 95 of the recording apparatus 2 are arranged. In the lower power connector 63b, pins 81 having the same number as that of the pins 80 formed in the upper power connector 64b are arranged. When the upper connector 64 is connected to the connector 4 of the recording apparatus 2, the plurality of pins 80 are connected to the power lines 95. When the upper connector 64 is connected to the lower connector 63 of another additional paper-feed device 50, the plurality of pins 80 are connected to the pins 81 of another additional paper-feed device 50.

One of the plurality of pins 80 is a power reception pin 80a, and the other pins are transfer pins 80b. One of the pins 81 is a pin 81a for supplying a power to an additional paper-feed device 50 at a stage subsequent to the additional paper-feed device 50, and the other pins are pins 81b for supplying a power to the additional paper-feed devices 50 in the second or any subsequent stages to the additional paper-feed device 50. The power reception pin 80a is connected to a power receiving unit 70 via a power-reception power line 96, and the transfer pin 80b is connected to the pin 81 via a transfer power line 97. Each of the transfer pins 80b is connected to the pin 80 arranged in an arrangement position shifted by one from the arrangement position of the transfer pin 80b. For example, one of the transfer pins 80b is connected to the pin 81a via the transfer power line 97. By connecting each of the transfer pins 80b to the pin 80 arranged in the arrangement position shifted by one, power can be supplied to the power receiving units 70 of all of the additional paper-feed devices 50 in the posterior stages of the additional paper-feed device 50. With the configuration, the power supply 90 provided in the recording apparatus 2 and the power receiving units 70 in the additional paper-feed devices 50 are connected in parallel in a one-to-one manner via the power line 95, the power-reception power line 96, and the transfer power line 97. As a result, as compared with the case where the power receiving units 70 of the additional paper-feed devices 50 are connected in series to the power supply 90, the power line for supplying power from the power supply 90 to each of the additional paper-feed devices 50 can be narrowed. Thus, the parts can be simplified.

As illustrated in FIG. 1, in the top plate of the device casing 50a, a paper ejection port 50d is open for passing the paper P which is fed to the recording apparatus 2 positioned above or the additional paper-feed device 50 positioned above. In the bottom plate of the device casing 50a, a paper feed port 50e is open for passing the paper P fed from the additional paper-feed device 50 positioned below.

In a lower part of the bottom plate of the device casing 50a, positioning holes 50c used for positioning another additional paper-feed device 50 to be connected to the additional paper-feed device 50 are formed. The positioning holes 50c are formed in positions matching the positioning holes 2c formed in the apparatus casing 2a in the horizontal direction in FIG. 1. On the other hand, positioning pins 50b corresponding to the positioning holes 50c and the positioning holes 2c in the recording apparatus 2 are formed in the upper part of the top plate of the device casing 50a.

The device casing 50a has a paper conveyance path 53 extending from the additional paper-feed roller 52 toward the paper ejection port 50d, and a paper conveyance path 55 extending from the paper feed port 50e toward the paper conveyance path 53. In the paper conveyance path 53, the feed roller pair 56 is disposed. In the configuration, the paper P fed to the paper conveyance path 53 is conveyed while being sandwiched by the feed roller pair 56 and fed to the paper conveyance path 35 in the recording apparatus 2 positioned above and the paper conveyance path 55 in the additional paper-feed device 50 positioned above. As described above, by the feed roller pair 56, the paper P can be transmitted/received between another additional paper-feed device 50 adjacent in the series connection or the adjacent recording apparatus 2. In the embodiment, the feed roller pair 56 corresponds to a conveyance mechanism.

Figure 3:
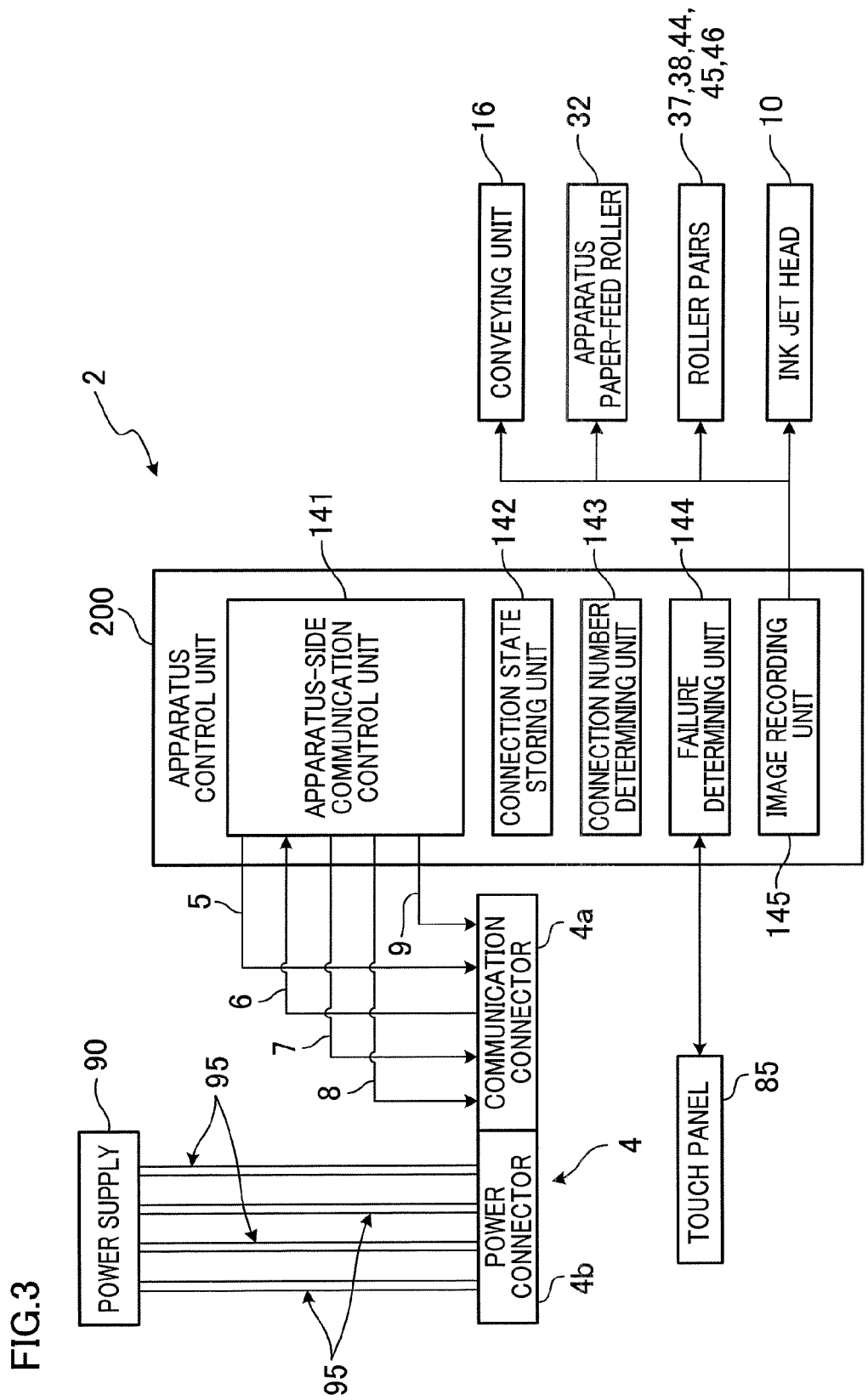
FIG. 3 is a diagram illustrating an electric configuration of a recording apparatus shown in FIG. 1.

Next, referring to FIG. 3, the apparatus control unit 200 of the recording apparatus 2 will be described specifically. The apparatus control unit 200 includes a CPU (Central Processing Unit), a ROM (Read Only Memory) rewritably storing programs executed by the CPU and data used by the programs, and a RAM (Random Access Memory) temporarily storing data at the time of executing a program. The function units constituting the apparatus control unit 200 are configured by cooperation of the hardware and software in the ROM. As illustrated in FIG. 3, the apparatus control unit 200 includes an apparatus-side communication control unit 141, a connection state storing unit 142, a connection number determining unit 143, a failure determining unit 144, and an image recording unit 145.

The apparatus-side communication control unit 141 performs various signal communications with each of the additional paper-feed devices 50 via the communication lines 5 to 8. The connection state storing unit 142 stores the identifier of each of the additional paper-feed devices 50 connected in series to the recording apparatus 2 and device state information indicating whether the device control unit 500 of the additional paper-feed device 50 corresponding to the identifier is normal or not so as to be associated with each other.

One of methods of determining the number of additional paper-feed devices 50 connected in series to the recording apparatus 2 is that the apparatus control unit 200 tries communicating with the device control unit 500 of the additional paper-feed device 50 corresponding to each of the stage numbers from the additional paper-feed device 50 in the first stage in order, and determines the number obtained by subtracting one from the number of stages with which communication cannot be performed as the number of the additional paper-feed devices 50 connected in series to the recording apparatus 2. In the method, however, when the device control unit 500 in the additional paper-feed device 50 is faulty, communication cannot be performed between the device control unit 500 and the apparatus control unit and there is consequently possibility that the number of additional paper-feed devices 50 connected in series to the recording apparatus 2 is determined to be smaller than the actual number.

The connection number determining unit 143 determines the number of additional paper-feed devices 50 connected in series to the recording apparatus 2 without the device control unit 500 of the additional paper-feed device 50. Concretely, the connection number determining unit 143 supplies the input connection signal to the communication line 8 via the apparatus-side communication control unit 141. By comparing the output connection signal output from the communication line 6 and the input connection signal, the connection number determining unit 143 determines the number of additional paper-feed devices 50 connected in series to the recording apparatus 2. In such a manner, the number of additional paper-feed devices 50 connected in series to the recording apparatus 2 can be determined accurately.

The connection number determining unit 143 stores, into the connection state storing unit 142, the identifier of the additional paper-feed device 50 in the first stage as the value of the input connection signal and the identifier of the additional paper-feed device 50 in the second and subsequent stages as a value obtained by adding one to the value of the input connection signal. For example, when the value of the input connection signal is "000" and the value of the output connection signal is "011", the connection number determining unit 143 determines that the number of additional paper-feed devices 50 connected in series to the recording apparatus 2 is three, and stores, into the connection state storing unit 142, "000" as the identifier of the additional paper-feed device 50 in the first stage, "001" as the identifier of the additional paper-feed device 50 in the second stage, and "010" as the identifier of the additional paper-feed device 50 in the third stage as the last stage.

The failure determining unit 144 determines whether each of the device control units 500 is normal or faulty by trying to communicate with the device control unit 500 of each of the plurality of additional paper-feed devices 50 connected in series to the recording apparatus 2, corresponding to the number of additional paper-feed devices 50 determined by the connection number determining unit 143. Concretely, the failure determining unit 144, first, supplies an authentication signal to the communication line 7 via the apparatus-side communication control unit 141. The authentication signal includes one of the identifiers stored in the connection state storing unit 142. As will be described later, in the case where the device control unit 500 of the additional paper-feed device 50 corresponding to the identifier included in the authentication signal is normal, a response signal is transmitted from the additional paper-feed device 50. In the case where the response signal is received within predetermined time since the authentication signal is supplied to the communication line 7, the failure determining unit 144 determines that the device control unit 500 of the additional paper-feed device 50 corresponding to the identifier included in the authentication signal is normal. In the case where the response signal is not received within predetermined time, the failure determining unit 144 determines that the device control unit 500 is faulty. On the basis of the determination result, the failure determining unit 144 stores the device state information corresponding to the identifier into the connection state storing unit 142. The failure determining unit 144 performs the processing on all of the identifiers stored in the connection state storing unit 142 and determines whether the device control unit 500 of the additional paper-feed device 50 is normal or faulty in all of the additional paper-feed devices 50 connected in series to the recording apparatus 2, corresponding to the number of the additional paper-feed devices 50 determined by the connection number determining unit 143. After that, the failure determining unit 144 displays, on the touch panel 85, a notification screen indicating whether the device control unit 500 of each of the additional paper-feed devices 50 is normal or faulty on the basis of the device state information stored in the connection state storing unit 142. Consequently, the user can visually recognize whether the device control unit 500 of each of the additional paper-feed devices 50 is normal or faulty. As a modification, the notification screen may be displayed on the touch panel 85 only in the case where there is an additional paper-feed device having a faulty device control unit 500. In the embodiment, the touch panel 85 corresponds to notifying unit. As another modification, only in the case where there is an additional paper-feed device having a faulty device control unit 500, sound may be generated from an alarm or the like. In this case, an alarm corresponds to notifying unit.

The image recording unit 145 performs image recording operation on the basis of a printing instruction received from an external device (not illustrated). The image recording operation includes first to third image recording operations. The first image recording operation is an operation of making the paper P fed from the apparatus paper-feed tray 31 of the recording apparatus 2 and recording an image on the paper P. Concretely, the image recording unit 145 controls the apparatus paper-feed roller 32 and the feed roller pairs 37, 38 and 44 to 46 so that the paper P is conveyed at a predetermined conveyance speed along the conveyance direction. The image recording unit 145 controls ink ejection of the head 10 so that blank ink is ejected to the paper P on the basis of image data included in the print instruction.

The second and third image recording operations are operations similar to the first image recording operation except that the paper P is fed from the additional paper-feed tray 51 in one of the additional paper-feed devices 50 connected in series to the recording apparatus 2. The second image recording operation is an operation performed in the case where the device control units 500 of all of the additional paper-feed devices 50 connected in series to the recording apparatus 2 are normal. The third image recording operation is an operation performed in the case where there is an additional paper-feed device 50 having a faulty device control unit 500.

In the second image recording operation, different from the first image recording operation, the image recording unit 145 does not drive the apparatus paper-feed roller 32 but, instead, drives the additional paper-feed roller 52 and the feed roller pair 56 in the additional paper-feed device 50 for feeding the paper P from the additional paper-feed tray 51 and the feed roller pair 56 in the additional paper-feed device 50 disposed between the additional paper-feed device 50 and the recording apparatus 2. The additional paper-feed roller 52 and the feed roller pair 56 in each of the additional paper-feed devices 50 are controlled by the device control unit 500 in each of the additional paper-feed devices 50 on the basis of a command signal received from the apparatus control unit 200 of the recording apparatus 2. As described above, by making the device control unit 500 control the additional paper-feed roller 52 and the feed roller pair 56, the process burden on the apparatus control unit 200 can be reduced.

In the third image recording operation, the image recording unit 145 does not drive the apparatus paper-feed roller 32 but, instead, drives the additional paper-feed roller 52 in the additional paper-feed device 50 for feeding the paper P from the additional paper-feed tray 51, and the feed roller pairs 56 in all of the additional paper-feed device 50. In the third image recording operation, the additional paper-feed roller 52 in the additional paper-feed device 50 for feeding the paper P from the additional paper-feed tray 51 is controlled by the device control unit 500 in the additional paper-feed device 50 on the basis of a command signal received from the recording apparatus 2. On the other hand, the feed roller pair 56 in each of the additional paper-feed devices 50 is controlled by the apparatus control unit 200 in the recording apparatus 2 by outputting the control signal to the control line 9.

Figure 4:
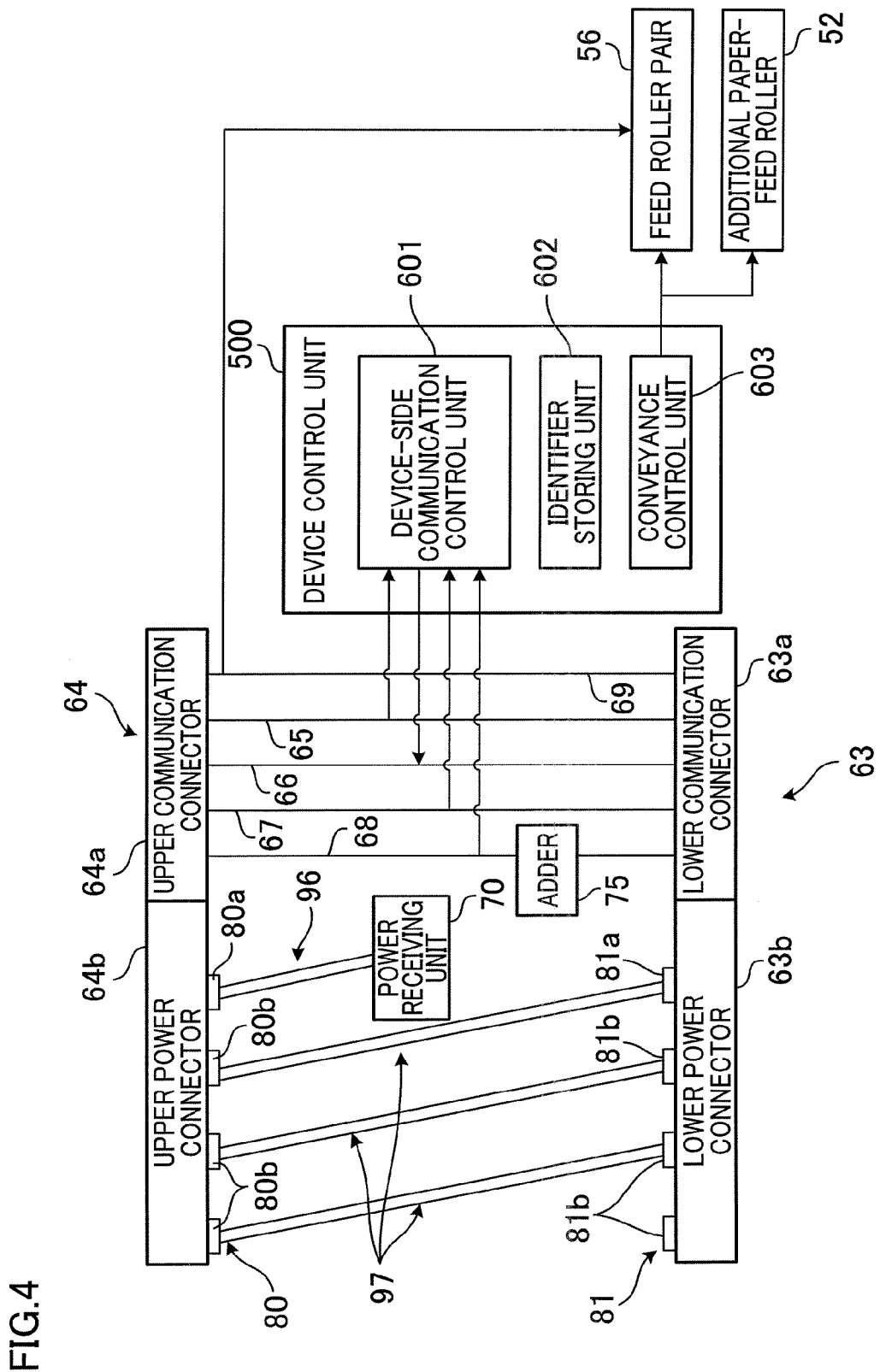
FIG. 4 is a diagram illustrating an electric configuration of an additional paper-feed device shown in FIG. 1.

Next, referring to FIG. 4, the device control unit 500 will be described specifically. The device control unit 500 includes a CPU, a ROM rewritably storing programs executed by the CPU and data used by the programs, and a RAM temporarily storing data at the time of executing a program. The function units constituting the device control unit 500 are configured by cooperation of the hardware and software in the ROM. As illustrated in FIG. 4, the device control unit 500 includes a device-side communication control unit 601, the identifier storing unit 602, and a conveyance control unit 603.

The device-side communication control unit 601 performs various signal communications with the recording apparatus 2 via the communication lines 65 to 68. When a connection signal is received from the recording apparatus 2 via the communication line 67, the device-side communication control unit 601 stores the connection signal as the identifier of the additional paper-feed device 50 into the identifier storing unit 602, and after that outputs a response signal to the recording apparatus 2 via the communication line 66. The response signal includes the identifier stored in the identifier storing unit 602.

In the case where the identifier included in the command signal received by the device-side communication control unit 601 matches with the identifier stored in the identifier storing unit 602, the conveyance control unit 603 controls the additional paper-feed roller 52 and the feed roller pair 56 on the basis of the received command signal.

Figure 5:
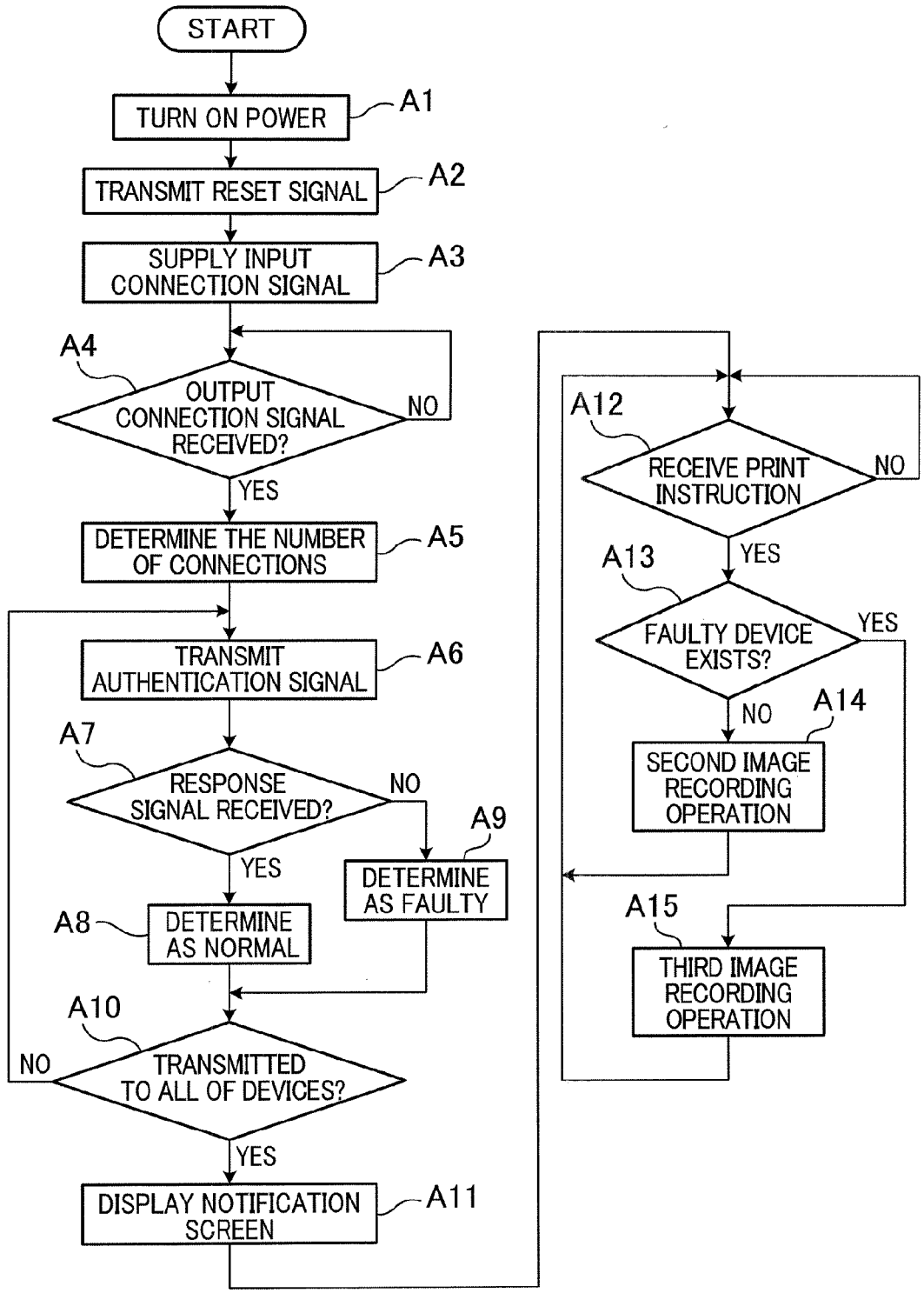
FIG. 5 is a flowchart for explaining the operation of the recording apparatus shown in FIG. 1.
Figure 6:
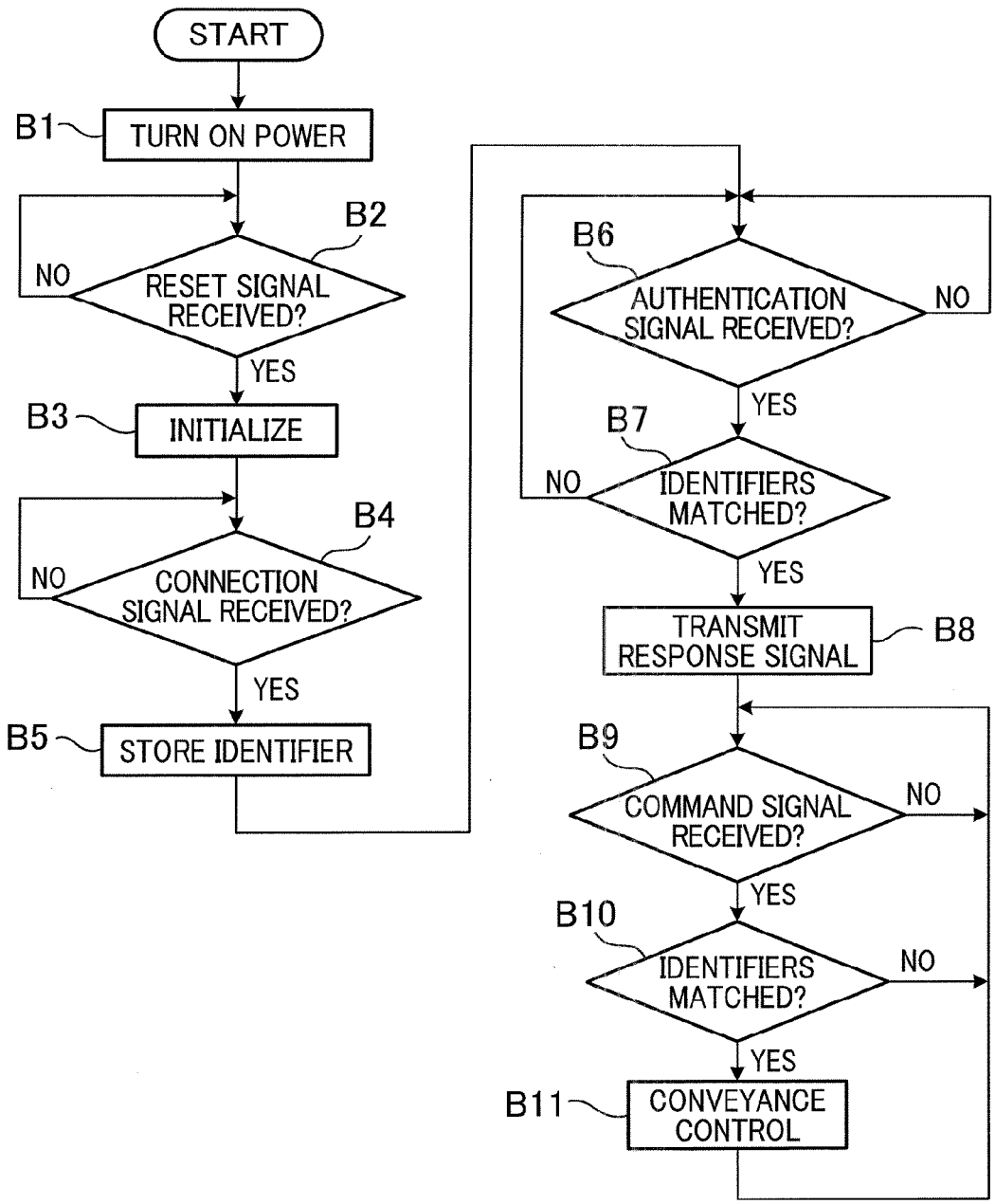
FIG. 6 is a flowchart for explaining the operation of the additional paper-feed device shown in FIG. 1.

Referring now to FIGS. 5 and 6, an example of the operation of the recording system 1 will be described. In the following description of the operation of the recording system 1, for convenience, it is assumed that the paper P is fed from the additional paper-feed tray 51 of the additional paper-feed device 50.

First, the operation of the recording apparatus 2 will be described with reference to FIG. 5. When the power supply of the recording system 1 is turned on (A1), the apparatus-side communication control unit 141 transmits a reset signal to each of the additional paper-feed devices 50 via the communication line 7 (A2). By the reset signal, the identifier stored in the identifier storing unit 602 in each of the additional paper-feed devices 50 is initialized. Next, the connection number determining unit 143 supplies the input connection signal to the communication line 8 via the apparatus-side communication control unit 141 (A3). In such a manner, a new identifier is stored in the identifier storing unit 602 of each of the additional paper-feed devices 50.

Next, the connection number determining unit 143 waits until an output connection signal is received via the communication line 6 (A4). When the output connection signal is received (YES in A4), by comparing the received output connection signal with the input connection signal, the number of additional paper-feed devices 50 connected in series to the recording apparatus 2 is determined (A5). At this time, the connection number determining unit 143 stores the identifier corresponding to each of the additional paper-feed devices 50 into the connection state storing unit 142 on the basis of the input connection signal and the output connection signal.

Subsequently, the failure determining unit 144 transmits an authentication signal including one identifier stored in the connection state storing unit 142 to each of the additional paper-feed devices 50 via the apparatus-side communication control unit 141 (A6). The failure determining unit 144 determines whether a response signal is received within predetermined time or not (A7). In the case where it is determined that the response signal is received within the predetermined time (YES in A7), it is determined that the device control unit 500 in the additional paper-feed device 50 corresponding to the identifier is normal, and device state information indicative of the state is stored so as to be associated with the identifier in the connection state storing unit 142 (A8). After completion of Step A8, the processing proceeds to Step A10.

On the other hand, in Step A7, in the case where it is determined that the response signal is not received within the predetermined time (NO in A7), it is determined that the device control unit 500 in the additional paper-feed device 50 corresponding to the identifier is faulty, and device state information indicative of the state is stored so as to be associated with the identifier in the connection state storing unit 142 (A9). After completion of Step A9, the processing proceeds to the process in Step A10.

In the process of step A10, the failure determining unit 144 determines whether or not the authentication signal is transmitted on all of identifiers stored in the connection state storing unit 142. In the case where it is determined that the authentication signal is not transmitted on all of the identifiers (NO in A10), it is regarded that there is an additional paper-feed device 50 to which communication is not tried, and the processing returns to Step A6. On the other hand, when it is determined that the authentication signal is transmitted on all of the identifiers (YES in A10), communication is tried to all of the additional paper-feed devices 50 and then the processing shifts to A11.

In Step A11, the failure determining unit 144 displays, on the touch panel 85, a notification screen indicating whether the device control unit 500 of each of the additional paper-feed devices 50 is normal or faulty on the basis of the device state information stored in the connection state storing unit 142.

Next, the image recording unit 145 determines whether a print instruction is received from an external device or not (A12). In the case where it is determined that a print instruction is not received from an external device (NO in A12), the image recording unit 145 waits until a print instruction is received. On the other hand, in the case where it is determined that a print instruction is received (YES in A12), the image recording unit 145 determines whether there is an additional paper-feed device 50 having a faulty device control unit 500 or not with referring to the connection state storing unit 142 (A13).

In the case where it is determined that there is no additional paper-feed device 50 having a faulty device control unit 500 (NO in A13), the image recording unit 145 executes the second image recording operation (A14). Concretely, the image recording unit 145 transmits, via the apparatus-side communication control unit 141, a command signal instructing driving of the additional paper-feed roller 52 and the feed roller pair 56 to the additional paper-feed device 50 which feeds the paper P from the additional paper-feed tray 51. The image recording unit 145 transmits, via the apparatus-side communication control unit 141, a command signal instructing driving of the feed roller pair 56 to another additional paper-feed device 50 positioned between the additional paper-feed device 50 for feeding the paper P and the recording apparatus 2. An identifier is included in the command signal, and the control based on the command signal is performed only on the additional paper-feed device 50 corresponding to the identifier. Further, the image recording unit 145 controls the apparatus paper-feed roller 32 and the feed roller pairs 37, 38, and 44 to 46 so that the paper P is conveyed at a predetermined conveyance speed along the conveyance direction and controls ink ejection of the head 10 so that black ink is ejected onto the paper P on the basis of image data included in a print instruction. As a result, an image is recorded on the paper P fed from the additional paper-feed device 50. After completion of Step A14, the processing returns to Step A12.

On the other hand, in the case where it is determined in Step A13 that there is an additional paper-feed device 50 having a faulty device control unit 500 (YES in A13), the image recording unit 145 executes the third image recording operation (A15). Concretely, the image recording unit 145 transmits, via the apparatus-side communication control unit 141, a command signal instructing driving of the additional paper-feed roller 52 to the additional paper-feed device 50 which feeds the paper P from the additional paper-feed tray 51 in the additional paper-feed devices 50 other than the faulty additional paper-feed device 50. The image recording unit 145 transmits, via the control line 9, a control signal to drive the feed roller pairs 56 in all of the additional paper-feed devices 50. The image recording unit 145 controls the apparatus paper-feed roller 32 and the feed roller pairs 37, 38, and 44 to 46 so that the paper P is conveyed at a predetermined conveyance speed along the conveyance direction and controls ink ejection of the head 10 so that black ink is ejected onto the paper P on the basis of image data included in a print instruction. As described above, the image recording unit 145 in the recording apparatus 2 controls the driving of the feed roller pair 56 in the additional paper-feed device 50 having the faulty device control unit 500, so that the paper P can be fed also from an additional paper-feed device 50 in a stage posterior to the faulty additional paper-feed device 50. After completion of Step A15, the processing returns to the Step A12. The operation of the recording apparatus 2 has been described above.

Next, the operation of the additional paper-feed device 50 will be described with reference to FIG. 6. When the power supply of the recording system 1 is turned on (B1), first, the device-side communication control unit 601 determines that the reset signal from the recording apparatus 2 is received (B2). In the case where it is determined that the reset signal is not received (NO in B2), the device-side communication control unit 601 waits until a reset signal is received. On the other hand, in the case where it is determined that the reset signal is received (YES in B2), the device-side communication control unit 601 initializes the identifier stored in the identifier storing unit 602 (B3). After that, the device-side communication control unit 601 determines whether the connection signal is received or not (B4). In the case where it is determined that the connection signal is not received (NO in B4), the device-side communication control unit 601 waits until the connection signal is received. On the other hand, in the case where it is determined that the connection signal is received (YES in B4), the device-side communication control unit 601 stores the received connection signal as an identifier in the identifier storing unit 602 (B5).

Subsequently, the device-side communication control unit 601 determines whether an authentication signal from the recording apparatus 2 is received or not (B6). When it is determined that an authentication signal is not received (NO in B6), the device-side communication control unit 601 waits until the authentication signal is received. On the other hand, in the case where it is determined that an authentication signal is received (YES in B6), the device-side communication control unit 601 determines whether an identifier included in the authentication signal and the identifier stored in the identifier storing unit 602 match or not (B7). In the case where it is determined that the identifiers do not match (NO in B7), the processing returns to Step B6. On the other hand, in the case where it is determined that the identifiers match (YES in B7), the device-side communication control unit 601 transmits a response signal corresponding to the authentication signal to the recording apparatus 2 via the communication line 66 (B8) and the processing shifts to in Step B9.

In Step B9, the device-side communication control unit 601 determines whether a command signal is received from the recording apparatus 2 or not. In the case where it is determined that a command signal is not received (NO in B9), the device-side communication control unit 601 waits until the command signal is received. On the other hand, in the case where it is determined that a command signal is received (YES in B9), the device-side communication control unit 601 determines whether the identifier included in the command signal and the identifier stored in the identifier storing unit 602 match or not (B10). In the case where it is determined that the identifiers do not match (NO in B10), the processing returns to Step B9. On the other hand, in the case where it is determined that the identifiers match (YES in B 10), the conveyance control unit 603 controls the additional paper-feed roller 52 and the feed roller pair 56 on the basis of the received command signal (B11). After completion of the process in Step B11, the processing returns to Step B9. The operation of the additional paper-feed device 50 has been described above.

In the recording system 1 of the embodiment, the apparatus control unit 200 of the recording apparatus 2 can grasp the number of additional paper-feed devices 50 connected in series to the recording apparatus 2 without the device control unit 500 of each of the additional paper-feed devices 50 by comparing the input connection signal and the output connection signal. The apparatus control unit 200 of the recording apparatus 2 can determine whether the device control unit 500 in each of the additional paper-feed devices 50 is normal or not without the device control unit 500 of another additional paper-feed device 50 by trying to communicate with the plurality of additional paper-feed devices 50 connected in series to the recording apparatus 2, corresponding to the number of additional paper-feed devices 50 via the communication lines 5, 6. With such a configuration, even in the case where the device control unit 500 of the additional paper-feed device 50 is faulty, the number of additional paper-feed devices 50 connected in series to the recording apparatus 2 and the device control unit 500 of the faulty additional paper-feed device 50 can be determined. Particularly, by making the configuration of detecting the number of additional paper-feed devices 50 connected in series to the recording apparatus 2 simple as described above, the reliability of the recording system 1 further improves.

In the embodiment, when the apparatus control unit 200 determines that there is an additional paper-feed device 50 having a faulty device control unit 500, in place of the device control unit 500, the apparatus control unit 200 controls the feed roller pair 56. Therefore, also in the additional paper-feed device 50 having the faulty device control unit 500, the paper P can be conveyed.

In addition, since the apparatus control unit 200 of the recording apparatus 2 and the feed roller pair 56 of each of the additional paper-feed devices 50 are connected to each other via the common control line 69, wiring can be simplified as compared with the case of connecting the apparatus control unit 200 and the additional paper-feed devices 50 by individual wires.

<Second Embodiment>

Figure 7:
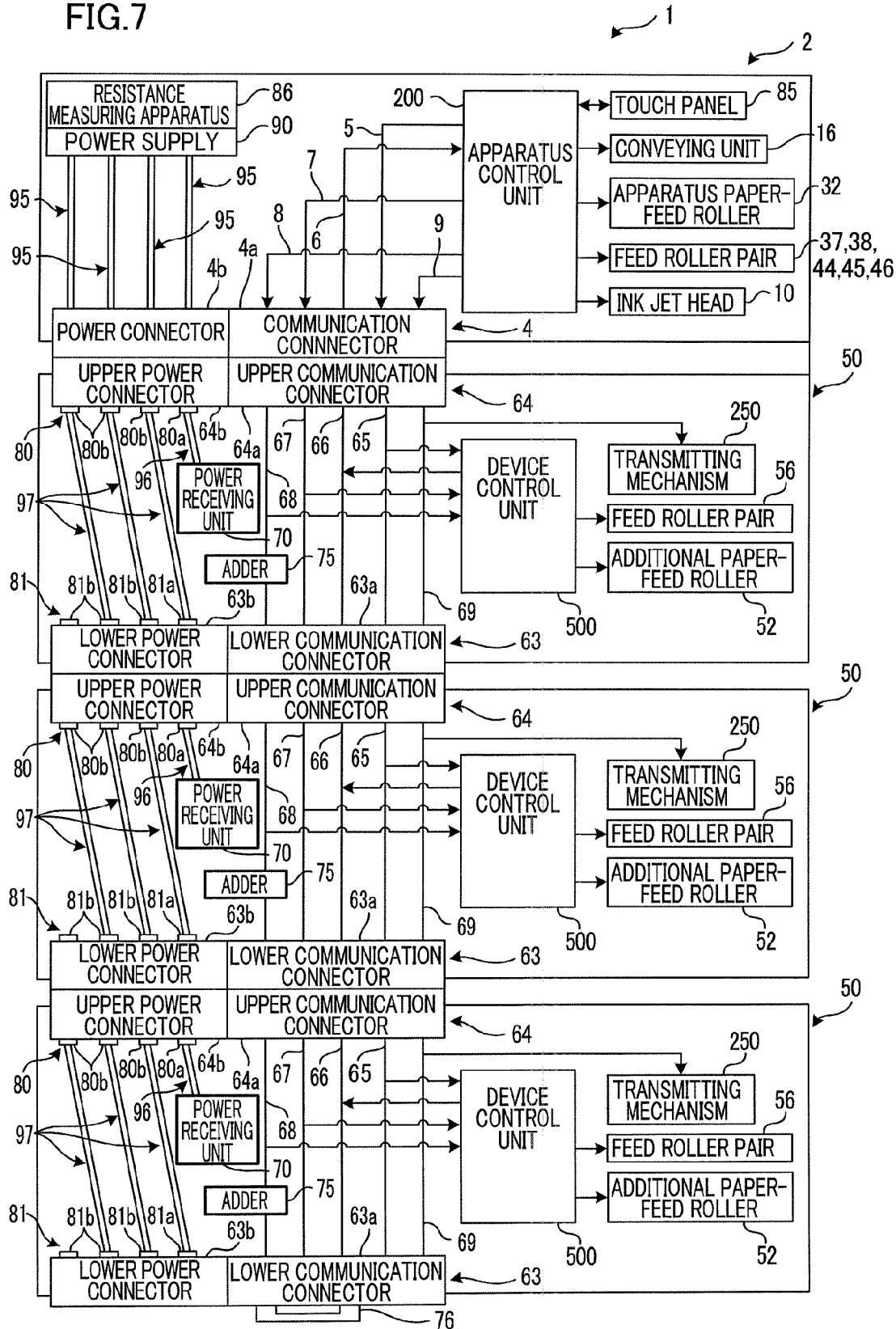
FIG. 7 is a schematic side view illustrating an electric configuration of a recording system according to a second embodiment.

Hereinafter, a second embodiment of the present invention will be described with reference to FIGS. 7 to 9. The second embodiment is different from the first embodiment in the point that a resistance measuring apparatus 86 is provided in place of the terminator 76. In the second embodiment, a transmitting mechanism 250 capable of transmitting a drive force between the feed roller pairs 56 of the additional paper-feed devices 50 neighboring in the series connection is provided for each of the additional paper-feed devices 50. The apparatus control unit 200 of the recording apparatus 2 controls the transmitting mechanism 250 in place of the feed roller pair 56 via the control line 9. In the following, the same reference numerals are designated to the same components as those of the foregoing first embodiment and their description will not be repeated.

The resistance measuring apparatus 86 is provided in the apparatus casing 2a of the recording apparatus 2 and measures resistance between a positive power supply line and a negative power supply line of each of the power lines 95. The resistance value between the positive and negative power supply lines varies between the case where the power line 95 is connected to the power receiving unit 70 and the case where the power line 95 is not connected to the power receiving unit 70 (that is, the power line 95 is open). In the embodiment, the connection number determining unit 143 measures the resistance value between the positive and negative power supply lines of each of the power lines 95 via the resistance measuring apparatus 86, thereby determining the number of additional paper-feed devices 50 connected in series to the recording apparatus 2. Concretely, the connection number determining unit 143 controls the resistance measuring apparatus 86 to apply a predetermined measurement voltage across the positive and negative power supply lines of each of the power lines 95 and pass a current. The current flowing between the positive and negative power supply lines of each of the power lines 95 varies according to the resistance value between the positive and negative power supply lines. The connection number determining unit 143 determines whether the power receiving unit 70 is connected to each of the power lines 95 or not on the basis of a change in the current value and determines the number of power lines 95 to which the power receiving unit 70 is connected as the number of additional paper-feed devices 50 connected in series to the recording apparatus 2. In the embodiment, a resistor in the power receiving unit 70 corresponds to a signal changing unit, and current flowing in each of the power lines 95 corresponds to a signal supplied from a first control unit to the signal changing unit. As described above, in the embodiment, by connecting the resistor (signal changing unit) in the power receiving unit 70 to the apparatus control unit 200 in the recording apparatus 2, the value of current itself flowing changes when the connection number determining unit 143 (resistance measuring apparatus 86) applies measurement voltage to each of the power lines 95.

As illustrated in FIGS. 8A and 8B, the transmitting mechanism 250 includes gears G1 to G3 rotatably supported by the device casing 50a, a transmission belt V, belt rollers BR1 to BR3, a movable gear G4, and a gear moving apparatus 255. The gear G1 is disposed close to the top plate of the device casing 50a, and the gear G2 is disposed close to the bottom plate of the device casing 50a. When the two additional paper-feed devices 50 are connected in series, the gear G1 of the additional paper-feed device 50 in the posterior stage and the gear G2 of the additional paper-feed device 50 in the anterior stage come into engagement.

The belt roller BR2 is formed axially and integrally with the gear G2, and the belt roller BR1 is formed axially and integrally with the gear G3. The belt roller BR3 is fixed to the rotary shaft of a drive motor for driving the feed roller pair 56. The belt V is wound around the belt rollers BR1 to BR3.

The gear moving apparatus 255 includes a guide hole 251, a shaft supporting plate 252, a rack gear 253, and a pinion gear 254. The guide hole 251 extends in the horizontal direction to guide the rotary shaft of the movable gear G4. The shaft supporting plate 252 rotatably supports the rotary shaft of the movable gear G4. The rack gear 253 extends in the horizontal direction and its right end part is fixed to the bottom of the shaft supporting plate 252. The pinion gear 254 is fixed to the rotary shaft of a gear drive motor (not illustrated) and engages with the rack gear 253. In the configuration, when the gear drive motor is driven and the pinion gear 254 rotates in forward/reverse directions, the rack gear 253 moves in the horizontal direction. With movement of the rack gear 253 in the horizontal direction, the movable gear G4 rotatably supported by the shaft supporting plate 252 moves along the guide hole 251 in the horizontal direction.

The movable gear G4 is disposed selectively in any one of a first position (refer to FIG. 8A) and a second position (refer to FIG. 8B), by the gear moving apparatus 255. In the first position, the movable gear G4 comes into engagement with both the gears G1 and G3 and drive force is transmitted between the gears G1 and G3. On the other hand, in the second position, the movable gear G4 does not engage with any of the gears G1 and G3 and drive force is not transmitted between the gears G1 and G3. In the second image recording operation, the movable gear G4 is disposed in the second position. In the third image recording operation, the movable gear G4 is disposed in the first position.

The operation of the transmitting mechanism 250 when only the feed roller pair 56 of an additional paper-feed device 50 in a posterior stage is driven in the case where the two additional paper-feed devices 50 are connected in series with the above-described configuration will be described. In the additional paper-feed device 50 in the posterior stage, when the drive motor of the feed roller pair 56 is driven, the belt roller BR3 rotates to roll the belt V. By the rolling of the belt V, the gears G2 and G3 formed integrally with the belt rollers BR2 and BR1, respectively, are rotated. In the case where the movable gear G4 is disposed in the first position, by the movable gear G4, the drive force is transmitted between the gears G1 and G3 to rotate the gear G1. Consequently, in the additional paper-feed device 50 in the anterior stage, the gear G2 which engages with the gear G1 of the additional paper-feed device 50 in the posterior stage rotates to roll the belt V. As a result, the feed roller pair 56 is rotated. As described above, in a state that the transmitting mechanism 250 of the additional paper-feed device 50 in the posterior stage disposes the movable gear G4 in the first position (first state), the drive force can be transmitted by mechanically connecting the feed roller pair 56 in the additional paper-feed device 50 in the posterior stage and the feed roller pair 56 in the additional paper-feed device 50 in the anterior stage. Therefore, the device control unit 500 of the additional paper-feed device 50 in the posterior stage drives the feed roller pair 56 of the additional paper-feed device 50, thereby enabling the feed roller pair 56 in the additional paper-feed device 50 in the anterior stage to be interlockingly driven.

On the other hand, in the case where the movable gear G4 is disposed in the second position, no drive force is transmitted between the gears G1 and G3. As described above, in a state that the transmitting mechanism 250 of the additional paper-feed device 50 in the posterior stage disposes the movable gear G4 in the second position (second state), the feed roller pair 56 in the additional paper-feed device 50 in the posterior stage and the feed roller pair 56 in the additional paper-feed device 50 in the anterior stage are not mechanically connected, so that the drive force cannot be transmitted. Therefore, even when the device control unit 500 of the additional paper-feed device 50 in the posterior stage drives the feed roller pair 56 of the additional paper-feed device 50, the feed roller pair 56 in the additional paper-feed device 50 in the anterior stage cannot be driven.

Figure 9:
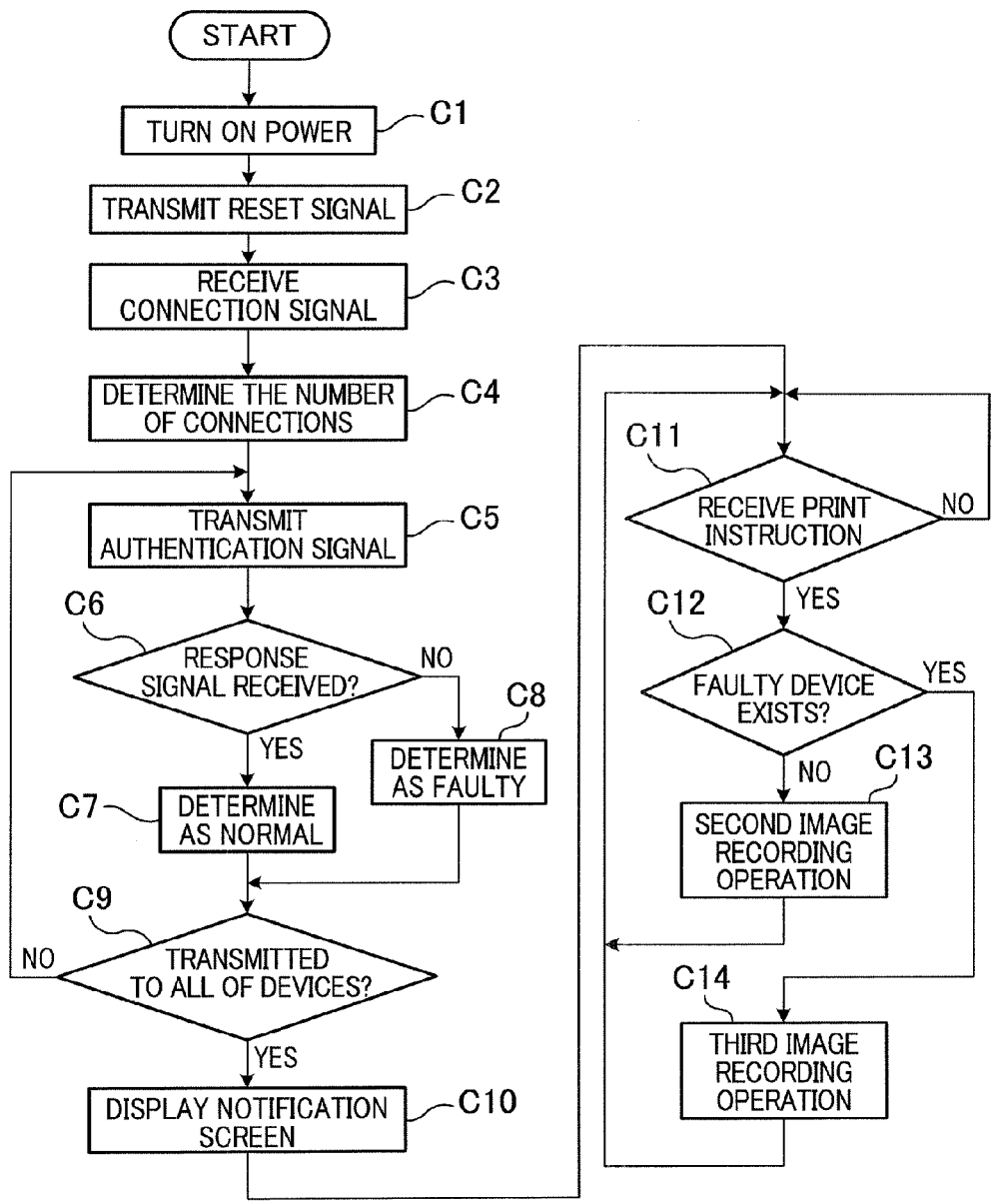
FIG. 9 is a flowchart for explaining the operation of a recording apparatus illustrated in FIG. 7.

Referring now to FIG. 9, the operation of the recording apparatus 2 of the second embodiment will be described. Since the operation of the additional paper-feed device 50 is similar to that in the first embodiment, its description will not be repeated.

When the power supply of the recording system 1 is turned on (C1), the apparatus-side communication control unit 141 transmits a reset signal to each of the additional paper-feed devices 50 via the communication line 7 (C2). Next, the connection number determining unit 143 supplies the input connection signal to the communication line 8 via the apparatus-side communication control unit 141 (C3). In such a manner, a new identifier is stored in the identifier storing unit 602 of each of the additional paper-feed devices 50.

Next, the connection number determining unit 143 controls the resistance measuring apparatus 86 and measures the resistance value between the positive and negative power supply lines in each of the power lines 95, thereby determining the number of additional paper-feed devices 50 connected in series to the recording apparatus 2 (C4). The connection number determining unit 143 stores an identifier corresponding to each of the additional paper-feed devices 50 of the determined number into the connection state storing unit 142. Concretely, the connection number determining unit 143 stores, into the connection state storing unit 142, the identifier of the additional paper-feed device 50 in the first stage as the value of the input connection signal supplied to the communication line 8 in the process of Step C3 and, in the second and subsequent stages, stores the identifiers of the additional paper-feed devices 50 until the number of stages corresponding to the determined number each as a value obtained by adding one to the input connection signal. After completion of Step C4, the processing shifts to in Step C5. Since Steps C5 to C13 are similar to those in Steps A6 to A14 in the foregoing first embodiment, the description will not be repeated.

In Step C12, in the case where it is determined that there is an additional paper-feed device 50 having a faulty device control unit 500 (YES in C12), the image recording unit 145 executes the third image recording operation (C14). Concretely, the image recording unit 145 transmits, via the apparatus-side communication control unit 141, a command signal to instruct driving of the additional paper-feed roller 52 and the feed roller pair 56 to an additional paper-feed device 50 which feeds the paper P from the additional paper-feed tray 51 in the additional paper-feed devices 50 other than the faulty additional paper-feed device 50. The image recording unit 145 transmits, via the apparatus-side communication control unit 141, a command signal to instruct driving of the feed roller pair 56 to the other additional paper-feed devices 50. Further, the image recording unit 145 transmits a control signal to the transmitting mechanism 250 via the control line 9 to dispose the movable gear G4 to the first position in all of the additional paper-feed devices 50. Consequently, the drive force can be transmitted between the feed roller pairs 56 of the additional paper-feed devices 50 adjacent to each other. The image recording unit 145 controls the apparatus paper-feed roller 32 and the feed roller pairs 37, 38, and 44 to 46 so that the paper P is conveyed at a predetermined conveyance speed along the conveyance direction, and controls ejection of ink from the head 10 so that black ink is ejected onto the paper P on the basis of image data included in a print instruction. The operation of the recording apparatus 2 has been described above.

As described above, in the second embodiment, in the case where there is an additional paper-feed device 50 having a faulty device control unit 500, the image recording unit 145 of the recording apparatus 2 controls the transmitting mechanism 250 of each of the additional paper-feed devices 50 to dispose the movable gear G4 to the first position, the drive force can be transmitted between the feed roller pairs 56 of the additional paper-feed devices 50 adjacent to each other. As a result, even in the case where there is an additional paper-feed device 50 having a faulty device control unit 500, by driving the feed roller pair 56 of the adjacent additional paper-feed device 50, the feed roller pair 56 of the faulty additional paper-feed device 50 can be interlockingly driven. Therefore, the paper P can be fed also from the additional paper-feed device 50 positioned posterior to the faulty additional paper-feed device 50.

In the first and second embodiments, various signals can be transmitted/received via individual communication lines connected between the apparatus control unit 200 in the recording apparatus 2 and the device control unit 500 in each of the additional paper-feed devices 50. In this case, by using the individual communication lines, various signals can be transmitted/received only between the recording apparatus 2 and a specific additional paper-feed device 50, so that it is unnecessary to include an identifier in a signal as in the foregoing embodiments. Although signals are transmitted/received between the recording apparatus 2 and the additional paper-feed device 50 by using the communication lines 5 to 8 in the foregoing embodiments, the signals other than the connection signal may be performed by radio.

Although the apparatus control unit 200 of the recording apparatus 2 and the feed roller pair 56 in each of the additional paper-feed devices 50 are connected by the common control lines 9 and 69 in the first embodiment, they may be connected by individual control lines. In this case, it is sufficient for the apparatus control unit 200 to control only the feed roller pair 56 of an additional paper-feed device 50 having a faulty device control unit 500 with the individual control line, so that the process burden on the apparatus control unit 200 can be lessened. Similarly, the apparatus control unit 200 of the recording apparatus 2 and the transmitting mechanism 250 in each of the additional paper-feed devices 50 may be connected by individual control lines in the second embodiment. In this case, it is sufficient for the apparatus control unit 200 to control only the transmitting mechanism 250 of an additional paper-feed device 50 adjacent to an additional paper-feed device 50 having a faulty device control unit 500, so that the process burden on the apparatus control unit 200 can be lessened.

The signal changing unit is not limited to that in the foregoing embodiments but any unit may be employed as long as it is connected to the apparatus control unit 200 without the device control unit 500 of another additional paper-feed device 50 and changes a signal input from the apparatus control unit 200. For example, the recording apparatus 2 is provided with a high-potential terminal which is set to a potential higher than the ground potential by the apparatus control unit 200, and the additional paper-feed device 50 is provided with a ground potential terminal. When the additional paper-feed device 50 is connected in series to the recording apparatus 2, the high-potential terminal of the recording apparatus 2 and the ground potential terminal of the additional paper-feed device 50 may be connected. In this case, when the additional paper-feed device 50 is connected to the recording apparatus 2 in series, the potential of the high-potential terminal of the recording apparatus 2 decreases, so that the number of additional paper-feed devices 50 connected in series to the recording apparatus 2 can be determined on the basis of a change in the potential. In the example, the signal changing unit corresponds to a ground potential terminal, and the potential set in the high-potential terminal corresponds to a signal input from the first control unit.

In the foregoing embodiments, determination of the number of additional paper-feed devices 50 connected in series to the recording apparatus 2 and determination of whether the paper-feed device control unit in each of the additional paper-feed devices 50 is normal or not are performed when the power supply of the recording system 1 is turned on. They may be performed in response to another trigger.

Although the additional paper-feed device 50 is described as an example of a connection device in the foregoing embodiments, the invention is not limited to the additional paper-feed device 50 and it may be an option device which is connected in series to the recording apparatus 2. For example, an additional paper-ejection device capable of ejecting the paper P on which an image is recorded by the recording apparatus 2, an additional finisher device capable of binding the paper P on which an image is recorded by the recording apparatus 2, or the like may be used. The recording apparatus 2 may not have the apparatus paper-feed tray 31.

In the foregoing embodiments, the apparatus control unit 200 or the device control unit 500 may be constructed by a single CPU, a plurality of CPUs, a specific ASIC (Application Specific Integrated Circuit), or a combination of a CPU and a specific ASIC.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A recording system comprising:
    a recording apparatus configured to record an image on a recording medium; and
    a plurality of option devices,
    wherein:
    the recording apparatus includes a first control unit configured to control an operation of the recording apparatus;
    the option devices are connected in series to the recording apparatus;
    each of the option devices includes
        a second control unit configured to control an operation of the option device,
        a signal changing unit connected to the first control unit without the second control unit of another option device, not controlled by the second control unit, and configured to change a signal supplied from the first control unit, and
        a communication line configured to connect the first control unit and the second control unit without the second control unit of another option device; and
    the first control unit is configured to:
        supply the signal to the signal changing unit in each of the option devices, and determine a number of the option devices connected in series to the recording apparatus based on a change in the supplied signal by the signal changing unit;
        try communication with the second control unit in each of the option devices via the communication line, the option devices being connected in series to the recording apparatus, corresponding to the determined number of option devices;
        determine that the second control unit of the option device is normal when the communication is performed; and
        determine that the second control unit of the option device is faulty when the communication is not performed.

2. The recording system according to claim 1, wherein the first control unit further comprises a notifying unit configured to notify a failure of the second control unit when the first control unit determines that the second control unit of the option device is faulty.

3. The recording system according to claim 1, wherein
    each of the option devices further comprises a conveying mechanism configured to transmit/receive a recording medium to/from the another option device adjacent in the series connection or the recording apparatus which is adjacent,
    the second control unit is configured to control the conveying mechanism,
    the first control unit is configured to control the conveying mechanism of each of the option devices,
    when the first control unit determines that the second control unit of the option device is normal, the second control unit of the option device is configured to control the conveying mechanism, and
    when the first control unit determines that the second control unit of the option device is faulty, the first control unit is configured to control the conveying mechanism.

4. The recording system according to claim 3, wherein
    the first control unit and the conveying mechanism of each of the option devices are connected via a common line, and
    when the first control unit determines that the second control unit of at least one of the option devices is faulty, the first control unit is configured to control the conveying mechanisms by using the common line.

5. The recording system according to claim 1, wherein each of the option devices further comprises:
    a conveying mechanism configured to transmit/receive a recording medium to/from the another option device adjacent in the series connection or the recording apparatus which is adjacent; and a transmitting mechanism configured to set a first state where a drive force is transmitted between conveying mechanisms, and a second state where a mechanical connection is cancelled, one of the conveying mechanisms mechanically connecting the other conveying mechanism of option device which is adjacent in the series connection, wherein the second control unit is configured to control the conveying mechanism, the first control unit is configured to control the transmitting mechanism and the conveying mechanism of each of the option devices, when the first control unit determines that the second control unit of the option device is normal, the first control unit is configured to control the transmitting mechanism to set in the second state and, when the first control unit determines that the second control unit is faulty, the first control unit is configured to control the transmitting mechanism to set in the first state.

6. The recording system according to claim 1, further comprising:

a power supply provided in the recording apparatus; and a plurality of power lines configured to
connect the power supply and each of the option devices in a one-to-one corresponding manner, and
supply a power from the power supply to each of the option devices.

7. The recording system according to claim 1, wherein,
the signal changing unit changes and outputs the signal output from the first control unit, when the signal is input to the signal changing unit.

8. The recording system according to claim 1, wherein,
the signal input from the first control unit to the signal changing unit of each of the option devices is a signal indicating a value,
the signal changing unit of each of the option devices is an adder configured to add a predetermined value to the input signal and output a resultant signal, and
the first control unit determines the number of the option devices connected in series to the recording apparatus, based on the value of the signal output from the adder of each of the option devices.

9. The recording system according to claim 8, wherein,
the adder of each of the option devices is connected in series to the first control unit by a common communication line,
the signal output from the first control unit is serially input to the adders of the option devices via the common communication line and the predetermined value is serially added, and
the first control unit determines the number of the option devices connected in series to the recording apparatus, based on the value of the signal output from the adder of the option device on the last stage, among the option devices connected in series to the recording apparatus.

10. The recording system according to claim 1, wherein,
as the signal changing unit is connected to the first control unit, the signal changing unit changes the signal when the signal is output from the first control unit.

11. The recording system according to claim 1, wherein,
the signal input from the first control unit to the signal changing unit of each of the option devices is a current,
the signal changing unit of each of the option devices is a resistor, and
the first control unit determines the number of the option devices connected in series to the recording apparatus, based on a change in a value of the current when the current is supplied to the resistor of the option devices.

12. A recording apparatus for use in a recording system including the recording apparatus having a first control unit and being configured to record an image on a recording medium, and a plurality of option devices connected in series to the recording apparatus, each of the option devices having a second control unit, a signal changing unit connected to the first control unit without the second control unit of another option device, not controlled by the second control unit, and is configured to change a signal supplied from the first control unit, and a communication line configured to connect the first control unit and the second control unit without the second control unit of another option device, wherein the first control unit is configured to:

supply the signal to the signal changing unit in each of the option devices, and determine a number of the option devices connected in series to the recording apparatus based on a change in the supplied signal by the signal changing unit;

try communication with the second control unit in each of the option devices via the communication line, the option devices being connected in series to the recording apparatus, corresponding to the determined number of option devices;

determine that the second control unit of the option device is normal when the communication is performed; and determine that the second control unit of the option device is faulty when the communication is not performed.

13. An option device for use in a recording system including a recording apparatus having a first control unit and being configured to record an image on a recording medium, and a plurality of option devices connected in series to the recording apparatus, each of the option devices having a second control unit, in which the first control unit is configured to determine a number of the option devices connected in series to the recording apparatus based on a change by a signal changing unit in a signal supplied to each of the option devices, try communication with the second control unit in each of the option devices via the communication line, the option devices being connected in series to the recording apparatus, corresponding to the determined number of option devices, determine that the second control unit of the option device is normal when the communication is performed, and determine that the second control unit of the option device is faulty when the communication is not performed, wherein the option device includes:

the signal changing unit connected to the first control unit of the recording apparatus without the second control unit of another option device, not controlled by the second control unit, and is configured to change the signal supplied from the first control unit; and a communication line configured to connect the first control unit and the second control unit without the second control unit of another option device so that the first and second control units perform communication.

* * * * *